United States Patent
Isomura

(10) Patent No.: US 7,639,863 B2
(45) Date of Patent: Dec. 29, 2009

(54) DIE-TO-DATABASE PHOTOMASK DEFECT DETECTION USING REGION DATA TO MODIFY INSPECTION THRESHOLDS

(75) Inventor: Ikunao Isomura, Kanagawa (JP)

(73) Assignee: Advanced Mask Inspection Technology Inc., Yokohama-shi (JP)

( * ) Notice: Subject to any disclaimer, the term of this patent is extended or adjusted under 35 U.S.C. 154(b) by 674 days.

(21) Appl. No.: 11/284,186

(22) Filed: Nov. 22, 2005

(65) Prior Publication Data

US 2007/0047799 A1 Mar. 1, 2007

(30) Foreign Application Priority Data

Aug. 31, 2005 (JP) ............................. 2005-252618

(51) Int. Cl.
*G06K 9/00* (2006.01)
(52) U.S. Cl. .................... 382/144; 382/145; 382/149
(58) Field of Classification Search ................. 382/144, 382/145, 149
See application file for complete search history.

(56) References Cited

U.S. PATENT DOCUMENTS

| | | | |
|---|---|---|---|
| 5,386,221 A | | 1/1995 | Allen et al. |
| 5,404,410 A | * | 4/1995 | Tojo et al. .................... 382/144 |
| 5,563,702 A | | 10/1996 | Emery et al. |
| 5,572,598 A | * | 11/1996 | Wihl et al. ................... 382/144 |
| 6,040,911 A | * | 3/2000 | Nozaki et al. ................ 356/394 |
| 6,069,971 A | * | 5/2000 | Kanno et al. ................. 382/144 |
| 6,484,306 B1 | * | 11/2002 | Bokor et al. .................. 716/21 |
| 2002/0114506 A1 | * | 8/2002 | Hiroi et al. ................... 382/149 |
| 2003/0137665 A1 | * | 7/2003 | Ando .......................... 356/394 |
| 2004/0105578 A1 | * | 6/2004 | Tsuchiya et al. ............. 382/144 |
| 2004/0148584 A1 | * | 7/2004 | Tokunaga et al. ............. 716/21 |

FOREIGN PATENT DOCUMENTS

| | | |
|---|---|---|
| JP | 8-76359 | 3/1996 |
| JP | 11-073501 | 3/1999 |

(Continued)

OTHER PUBLICATIONS

Tsuchiya, H., et al. (Apr. 1998) "A gray map reference pattern generator of a die-to-database mask inspection system for 256Mbit and 1Gbit DRAMs." SPIE Conference on Photomask and X-Ray Mask Technology V. SPIE vol. 3412, pp. 544-551.*
U.S. Appl. No. 11/276,426, filed Feb. 28, 2006, Isomura.

*Primary Examiner*—Brian P Werner
*Assistant Examiner*—Barry Drennan
(74) *Attorney, Agent, or Firm*—Oblon, Spivak, McClelland, Maier & Neustadt, L.L.P

(57) ABSTRACT

A pattern inspection apparatus, including an optical image acquiring unit that acquires optical image data of a target plate to be inspected, the target plate being formed as a pattern. The pattern inspection apparatus also includes a design image data generating unit that generates design image data based on a design pattern serving as a base of pattern formation of the target plate. The pattern inspection apparatus further includes a comparing unit that inputs region image data generated based on information of a region pattern which is input to the pattern inspection apparatus. The information of the region pattern represents a predetermined region and is formed in the same format as that of information of the design pattern. The comparing unit compares the optical image data with the design image data based on the region image data.

10 Claims, 13 Drawing Sheets

FOREIGN PATENT DOCUMENTS

| | | |
|---|---|---|
| JP | 2002-237445 | 8/2002 |
| JP | 3413110 | 3/2003 |
| JP | 2003-215059 | 7/2003 |
| JP | 2004-101654 | 4/2004 |
| JP | 2004-191957 | 7/2004 |
| JP | 2004-317427 | 11/2004 |

* cited by examiner

DIE-TO-DATABASE PHOTOMASK DEFECT DETECTION USING REGION DATA TO MODIFY INSPECTION THRESHOLDS

CROSS-REFERENCE TO RELATED APPLICATION

This application is based upon and claims the benefit of priority from prior Japanese Patent Application No. 2005-252618 filed on Aug. 31, 2005 in Japan, the entire contents of which are incorporated herein by reference.

BACKGROUND OF THE INVENTION

1. Field of the Invention

The present invention relates to a pattern inspection apparatus, a pattern inspection method, or a program which causes a computer to execute the method, such as a pattern inspection technique which inspects a pattern defect of an object serving as a target plate used in manufacturing a semiconductor, and an apparatus which inspects a defect of a considerably small pattern of a photomask, a wafer, or a liquid crystal substrate used in manufacturing a semiconductor device or a liquid crystal display (LCD).

2. Related Art

In recent years, with a high integration density and a large capacity of a large-scale integrated circuit (LSI), a circuit line width required for semiconductor devices increasingly narrows. These semiconductor devices are manufactured such that a pattern is exposed and transferred on a wafer by a reduced projection exposure device called a stepper while using an original pattern with a circuit pattern formed thereupon (The original pattern is also called a mask or a reticle. The original pattern will be generally called as a mask hereinafter.) to form a circuit. Therefore, in manufacturing a mask to transfer the fine circuit pattern on a wafer, a pattern drawing device which can draw a fine circuit pattern is utilized. A pattern drawing device may directly draw a pattern circuit on a wafer. An electronic beam drawing device is also described in a reference (for example, see Japanese Patent Application, Publication No. 2002-237445).

Alternatively, in addition to the electronic beam drawing device, a laser beam drawing device which draws a pattern by using a laser beam is under development, and is disclosed in references (for example, see U.S. Pat. No. 5,386,221).

An improvement in yield is essential in manufacturing an LSI which requires a lot of manufacturing cost. However, as represented by a 1-gigabit DRAM (Random Access Memory), the order of a pattern constituting an LSI has been changing from a sub-micron order to a nano order. As one serious factor which decreases a yield, a pattern defect of a mask used when an ultrafine pattern is exposed and transferred on a semiconductor wafer by a photolithography technique is known. In recent years, with a miniaturization of an LSI pattern formed on a semiconductor wafer, a size which must be detected as a pattern defect has also become considerably small. For this reason, a pattern inspection apparatus which inspects a defect of a transfer mask used in manufacturing an LSI must be increased in precision.

On the other hand, with development of multimedia, an LCD (Liquid Crystal Display) has a liquid crystal substrate size of a 500 mm×600 mm or larger, and micropatterning of a TFT (Thin Film Transistor) or the like formed on a liquid crystal substrate advances. Therefore, it is required that a considerably small pattern defect be inspected in a large area. For this reason, development of a pattern inspection apparatus which efficiently inspects a defect of a pattern of a large-area LCD and a photomask used in manufacturing the large-area LCD in a short period of time is urgently required.

In this case, in a conventional pattern inspection apparatus, it is known that an optical image obtained by picking up an image of a pattern formed on a target plate such as a lithography mask or the like at a predetermined magnification by using a magnifying optical system is compared with design data or an optical image obtained by picking up the image of the same pattern on the target plate to perform inspection (for example, see Japanese Patent Application, Publication No. HEI08-76359).

For example, as pattern inspection methods, "die to die inspection" which compares optical image data obtained by picking up images of the same patterns at different places on the same mask and "die to database inspection" which generates design image data based on drawing data (information of a design pattern) obtained by converting CAD data used in drawing a mask pattern into data in an inspection apparatus input format and compares the design image data with optical image data serving as measurement data obtained by picking up the image of a pattern are known. In the inspection methods in the inspection apparatus, a target plate is placed on a stage, and a flux of light scans the target plate as a result of the movement of the stage to perform inspection. The flux of light is irradiated on the target plate from a light source and an illumination optical system. Light transmitted through the target plate or reflected by the target plate is focused on a sensor through an optical system. The image picked by the sensor is transmitted to a comparing circuit as measurement data. In the comparing circuit, after alignment of the images, the measurement data is compared with reference data based on an appropriate algorithm. When the measurement data is different from the reference data, it is determined that a pattern defect is present.

In recent years, the line width of a design pattern narrows, the presence of a micropattern for optical proximity correction (OPC) makes it difficult to match the design image data and the optical image data serving as measurement data, and an object which is not essentially determined as a defect is occasionally determined as a defect (pseudo defect). In contrast to this, when a threshold value for decision is moderated, a defect in a pattern which requires a high dimensional precision cannot be detected. For this reason, it has been required that a drawing pattern be compared and inspected at a plurality of inspection precisions.

When a defect appears in a target plate, a user generally reviews the defect. However, a considerably larger number of micropatterns and the like for the above optical proximity correction (OPC) are arranged (for example, at several ten thousands). For this reason, if all the micropatterns are determined as defects, quantity of work and time required to review the defects by a user exceed their limitations. As described above, when a large number of pseudo defects appear in the target plate, the inspection itself must be disadvantageously performed again. Alternatively, an expensive target plate itself must be disadvantageously manufactured again. In contrast to this, when the threshold value for decision is moderated, it is disadvantageously impossible to detect a defect in a pattern which requires a high dimensional precision.

A technique in which drawing patterns are compared and inspected while being classified into a plurality of ranks is disclosed in references (for example, see Japanese Patent Application, Publication No. 2004-191957). However, in this reference, a method of embodying an apparatus by classifying drawing patterns into a plurality of ranks is not concretely described. The method is practically insufficient, and a method for solving the problem is desired. In addition, a method for automatically detecting an OPC pattern from design image data (image data) to reduce the number of pseudo defects is proposed (for example, Japanese Patent No. 3413110).

BRIEF SUMMARY OF THE INVENTION

An aspect of the present invention has its object to provide a method and apparatus which overcome the above problems and perform pattern inspection which decreases the number of pseudo defects.

A pattern inspection apparatus according to an embodiment of the present invention includes:

an optical image acquiring unit which acquires optical image data of a target plate to be inspected, the target plate being formed as a pattern;

a design image data generating unit which generates design image data based on a design pattern serving as a base of pattern formation of the target plate; and a comparing unit which compares the optical image data with the design image data, wherein the comparing units inputs region image data generated based on information of a region pattern representing a predetermined region and formed in the same format as that of information of the design pattern and, in comparing the optical image data and the design image data, changes determination conditions based on the region image data.

A pattern inspection method according to an embodiment of the present invention includes:

acquiring optical image data of a target plate to be inspected, the target plate being formed as a pattern;

generating design image data based on a design pattern serving as a base of pattern formation of the target plate;

generating region image data based on information of a region pattern formed in the same format as that of information of the design pattern and representing a predetermined region of the target plate; and comparing the design image data with the optical image data by using the region image data.

Program-recorded readable recording medium according to an embodiment of the present invention, the program which causes a computer, executes:

a storing process which stores information of the design pattern serving as a base of the pattern formation on a target plate to be inspected, the target plate being formed as a pattern, and information of a region pattern formed in the same format as that of the information of the design pattern and representing a predetermined region on the target plate in a storing device;

a design image data generating process which generates design image data based on the information of the design pattern stored in the storing device;

a region image data generating process which generates region image data based on the region pattern stored in the storing device; and a comparing process which receives optical image data of the target plate and compares the design image data with the optical image data by using the region image data.

DETAILED DESCRIPTION OF THE INVENTION

Figure 1:
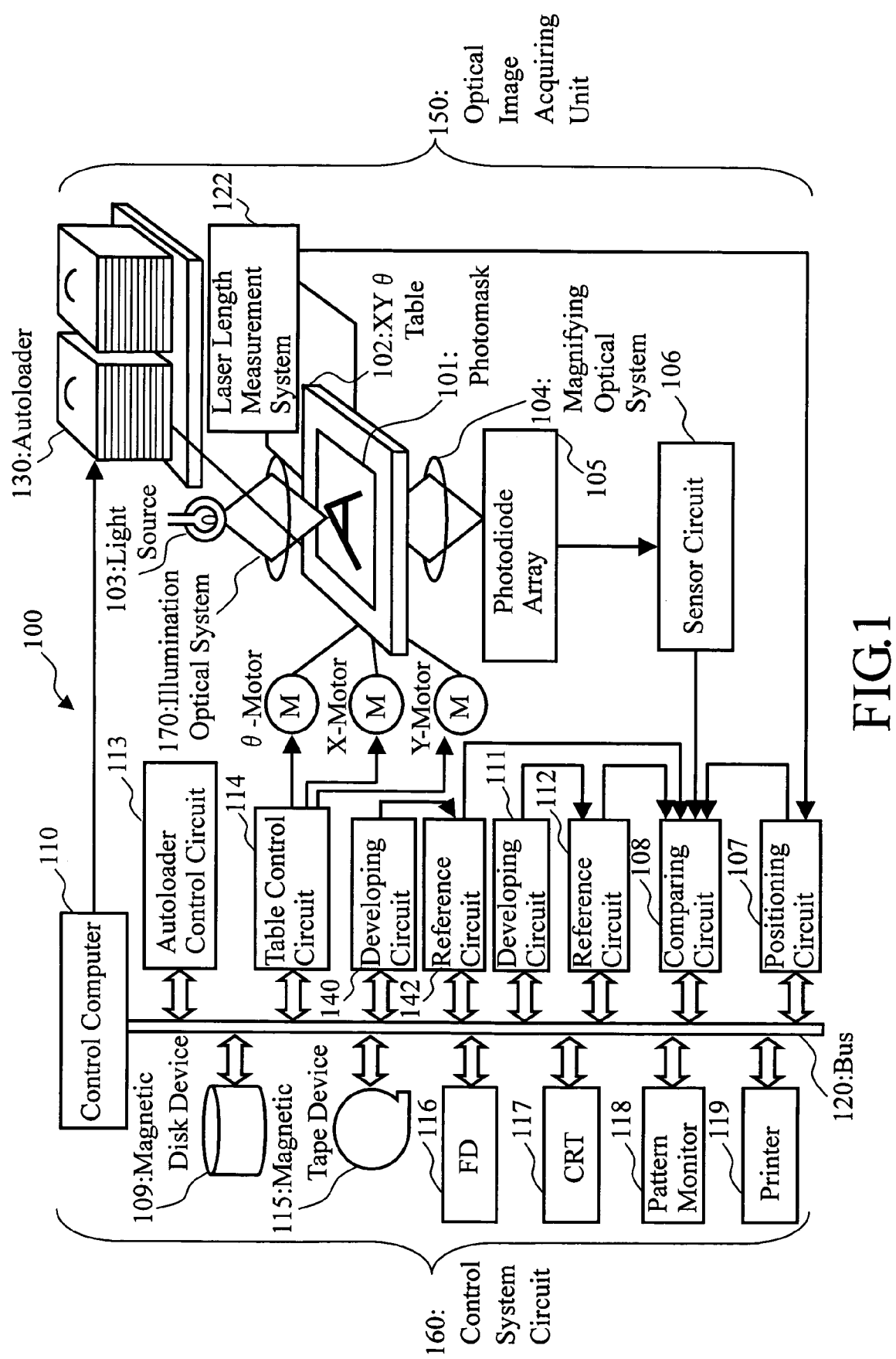
FIG. 1 is a conceptual diagram showing the configuration of a pattern inspection apparatus according to a first embodiment.

FIG. 1 is a conceptual diagram showing the configuration of a pattern inspection apparatus according to the first embodiment.

In FIG. 1, a pattern inspection apparatus 100 which inspects a defect of a substrate such as a mask or a wafer serving as a target plate includes an optical image acquiring unit 150 and a control system circuit 160. The optical image acquiring unit 150 includes an XYθ table 102, a light source 103, a magnifying optical system 104, a photodiode array 105, a sensor circuit 106, a laser length measurement system 122, an autoloader 130, and an illumination optical system 170. In the control system circuit 160, a control calculator 110 serving as a computer is connected, through a bus 120 serving as a data transmission path, to a positioning circuit 107, a comparing circuit 108 serving as an example of a comparing unit; a developing circuit 111 and a reference circuit 112 serving as an example of a first design image data generating unit; a developing circuit 140 and a reference circuit 142 serving as an example of a region image data generating unit; an autoloader control circuit 113; a table control circuit 114; a magnetic disk device 109, a magnetic tape device 115, and a flexible disk device (FD) 116 serving as an example of a storing device; a CRT 117; a pattern monitor 118; and a printer 119. The XYθ table 102 is driven by an X-axis motor, a Y-axis motor, and a θ-axis monitor. In FIG. 1, units except for constituent units necessary for explaining the first embodiment are not shown. The pattern inspection apparatus 100 generally includes other necessary constituent elements as a matter of course.

Figure 2:
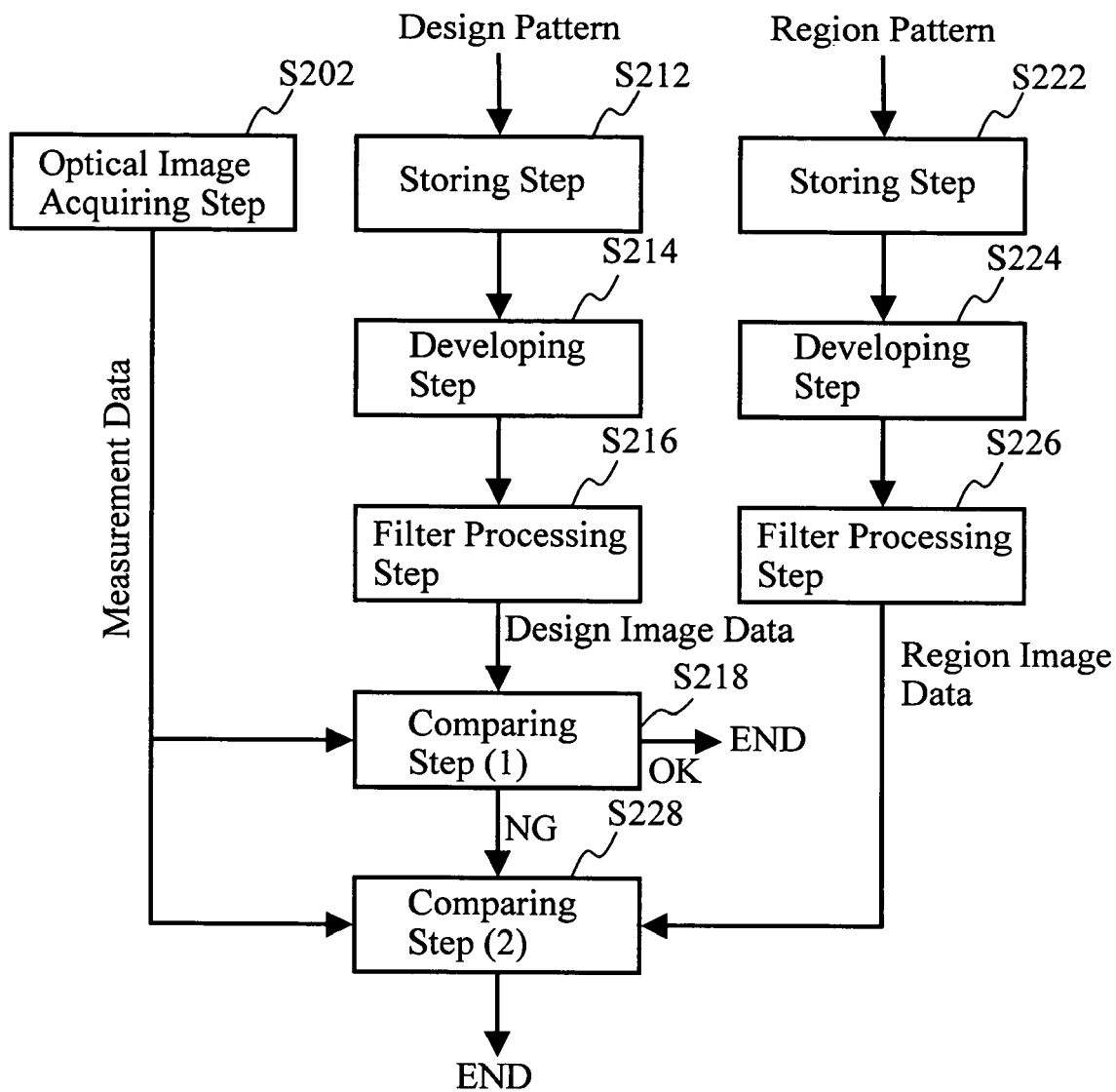
FIG. 2 is a flow chart showing main steps of a pattern inspection method according to the first embodiment.

FIG. 2 is a flow chart showing main steps of a pattern inspection method according to the first embodiment.

In FIG. 2, the pattern inspection method executes a series of steps, i.e., an optical image acquiring step (S202); a design pattern data storing step (S212); a developing step (S214) serving as an example of the design image data generating step; a filter processing step (S216), a comparing step (S218); a region data storing step (S222); another developing step (S224) serving as an example of the region image data generating step; a filter processing step (S226); and another comparing step (S228).

In S (step) 202, as the optical image acquiring step, the optical image acquiring unit 150 acquires an optical image (measurement data) on a photomask 101 serving as a target plate on which a graphic expressed by graphic data included in design pattern data are drawn based on the design pattern data. More specifically, the optical image is acquired as follows.

The photomask 101 serving as a target plate to be inspected is placed on the XYθ table 102 which is arranged such that the XYθ table 102 can be moved in a horizontal direction and a rotating direction by the X-, Y-, and θ-axis motors. On the pattern formed on the photomask 101, light is irradiated by the appropriate light source 103 arranged above the XYθ table 102. A flux of light irradiated from the light source 103 is irradiated on the photomask 101 serving as a target plate through the illumination optical system 170. Below the photomask 101, the magnifying optical system 104, the photodiode array 105, and the sensor circuit 106 are arranged. The light transmitted through the photomask 101 serving as a target plate such as an exposure mask is focused on the photodiode array 105 as an optical image through the magnifying optical system 104 and enters the photodiode array 105. Focal point adjustment of the magnifying optical system 104 may be automatically performed by an automatic focusing mechanism (not shown).

Figure 3:
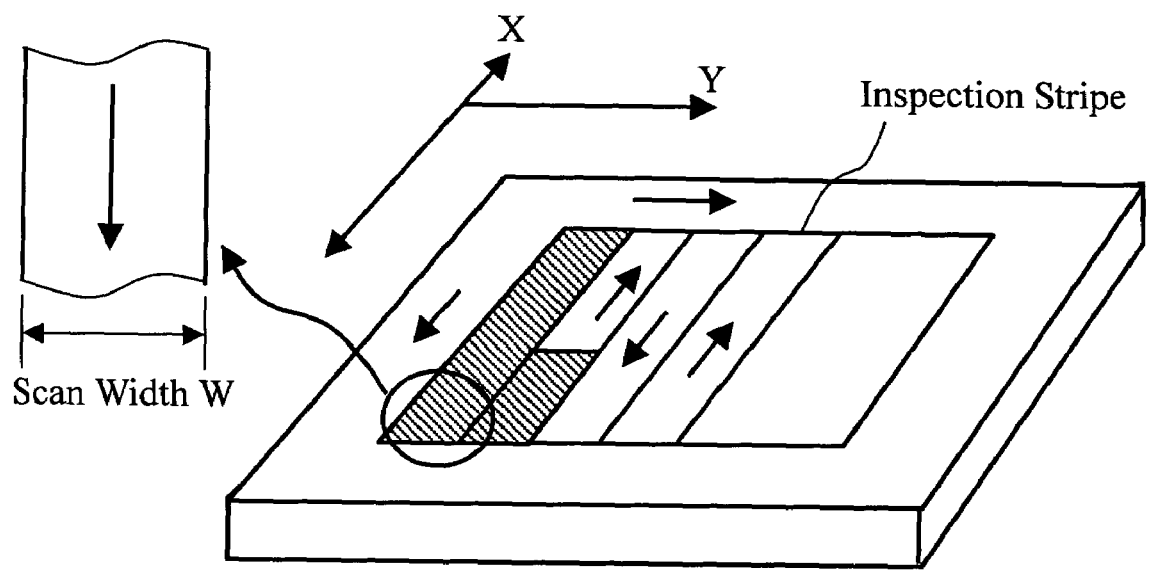
FIG. 3 is a diagram for explaining a procedure of acquiring an optical image.

FIG. 3 is a diagram for explaining a procedure for acquiring an optical image.

A region to be inspected is, as shown in FIG. 3, virtually divided into a plurality of strip-like inspection stripes each having a scan width W in a Y direction, and the operation of the XYθ table 102 is controlled such that the divided inspection stripes are continuously scanned. While the XYθ table 102 moves in the X direction, an optical image is acquired. In the photodiode array 105, images each having a scan width W as shown in FIG. 3 are continuously input. After an image on a first inspection stripe is acquired, images each having the scan width W are continuously input while an image on a second inspection stripe is moved in the reverse direction at this time. When an image on a third inspection stripe is to be acquired, the image is acquired while the image is moved in the direction reverse to the direction for acquiring the image on the second inspection stripe, i.e., the direction for acquiring the image on the first inspection stripe. In this manner, the images are continuously acquired to make it possible to shorten wasteful processing time.

The image of the pattern focused on the photodiode array 105 is photo-electrically converted by the photodiode array 105. Furthermore, the electric image is A/D-converted (analog-digital-converted) by the sensor circuit 106. In the photodiode array 105, a sensor such as a TDI (Time Delay Integrator) sensor is arranged. The XYθ table 102 serving as a stage is continuously moved in the X-axis direction to cause the TDI sensor to pick up the image of the pattern of the photomask 101 serving as a target plate. An inspection optical system having a large magnification is constituted by the light source 103, the magnifying optical system 104, the photodiode array 105, and the sensor circuit 106.

The XYθ table 102 is driven by the table control circuit 114 under the control of the control calculator 110. The XYθ table 102 can be moved by a drive system such as 3-axis (X-Y-θ) motors which drive the XYθ table 102 in the X direction, the Y direction, and the θ direction. As these X motor, Y motor, and θ motor, for example, step motors can be used. A moving position of the XYθ table 102 is measured by the laser length measurement system 122 and supplied to the position circuit 107. The photomask 101 on the XYθ table 102 is automatically carried from the autoloader 130 driven by the autoloader control circuit 113 and automatically discharged upon completion of the inspection.

Measurement data (optical image) output from the sensor circuit 106 is transmitted to the comparing circuit 108 together with data output from the position circuit 107 and representing the position of the photomask 101 on the XYθ table 102. The measurement data is, for example, 8-bit unsigned data, and expresses grayscales of brightness of respective pixels.

In step S212, as the data storing step, information of the first design pattern used in pattern formation for the photomask 101 is stored in the magnetic disk device 109 serving as an example of a storing device (storing unit).

In step S214, as the developing step, the developing circuit 111 reads the information of the design pattern from the magnetic disk device 109 through the control calculator 110, converts the read design pattern serving as design graphic data of the photomask 101 serving as a target plate to be inspected into binary or multivalued image data (first design image data). The image data is transmitted to the reference circuit 112.

Figure 4:
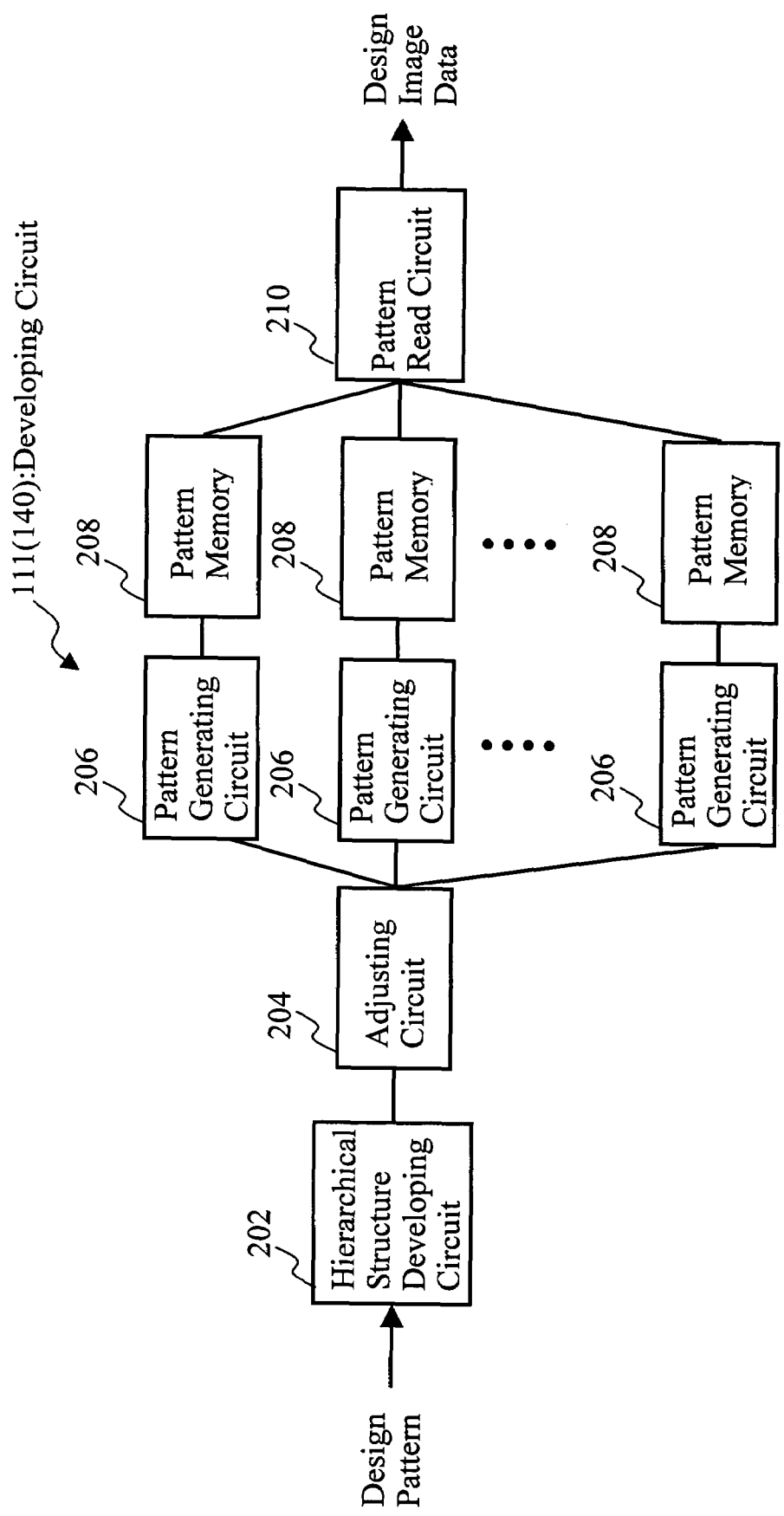
FIG. 4 is a block diagram showing an example of the configuration of a developing circuit.

FIG. 4 is a diagram showing an example of the configuration of the developing circuit.

In FIG. 4, the developing circuit 111 has a hierarchical structure developing circuit 202, an adjusting circuit 204, pattern generating circuits 206, pattern memories 208, and a pattern read circuit 210. The pattern generating circuits 206 and the pattern memories 208 are arranged in a plurality of stages such that each pattern generating circuit 206 and each pattern memory 208 constitute one pair.

In this case, graphics included in the design pattern include rectangles and triangles as basic graphics. For example, graphic data which defines the shapes, sizes, positions, and the like of pattern graphics by information including coordinates (x, y) at reference positions of the graphics, lengths of sides, and graphic codes serving as identifiers which discriminate graphic types such as a rectangle and a triangle from each other are stored.

When the information of the design pattern serving as the graphic data is input to the developing circuit 111, the hierarchical structure developing circuit 202 develops the information into data of each graphic and interprets the graphic code representing a graphic shape of the graphic data, a graphic size, and the like. In the pattern generating circuit 206, as a pattern arranged in a grid serving as a unit having a predetermined quantization size, binary or multivalued design image data is developed. The developed design image data is temporarily accumulated in the pattern memory 208. In other words, in the pattern generating circuit 206 serving as an example of an occupation rate calculating unit, the design pattern data is loaded, an occupation rate of a graphic on the design pattern is calculated in each grid obtained by virtually dividing the inspection region in units of predetermined sizes, and n-bit occupation-rate data is output to the pattern memory 208. For example, one grid is preferably set as one pixel. If it is assumed that one pixel has a resolving power of $1/2^8$ (=$1/256$), $1/256$ small regions are allocated to the region of the graphics arranged in a pixel to calculate an occupation rate in the pixel. The occupation rate is output to the pattern memory 208 as 8-bit occupation-rate data.

In this case, in order to cause the plurality of pattern generating circuits 206 to efficiently perform a parallel processing operation, the adjusting circuit 204 distributes input data to each of the pattern generating circuits 206. The pattern read circuit 210 reads the occupation-rate data stored in the pattern memory 208. In the pattern read circuit 210, when occupation-rate data is present in the same pixel, the occupation data is added to the read data and read. In this manner, a graphic occupation rate (grayscale value) in each pixel is known.

In step S216, as the filter processing step, the reference circuit 112 performs an appropriate filter processing to design image data serving as image data of a transmitted graphic.

Figure 5:
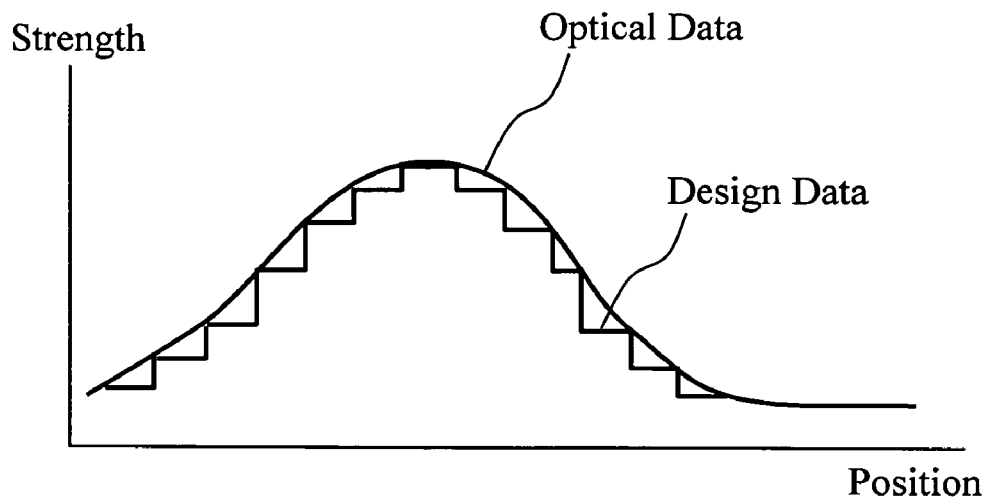
FIG. 5 is a graph for explaining a filter processing.

FIG. 5 is a diagram for explaining the filter processing.

Since measurement data serving as an optical image obtained from the sensor circuit 106 is set in a state in which the filter operates by the resolving characteristics of the magnifying optical system 104, the aperture effect of the photodiode array 105, and the like, in other words, in a continuously changing analog state, a filter processing is also performed to the first design image data serving as image data on a design side having a digital image intensity (gray value) to make it possible to match the design image data with the measurement data. In this manner, a reference image to be compared with the optical image is formed.

In step S218, as the comparing step (1), the comparing circuit 108 loads an optical image serving as measurement data of a pattern to be inspected generated by the sensor circuit 106 based on a transmitted image obtained from the photomask 101 serving as a target plate and a reference image serving as first design image data generated by the developing circuit 111 and the reference circuit 112, compares these images with each other according to a predetermined algorithm, and determines the presence/absence of a defect.

In this state, a pseudo defect is generated as described above. In the first embodiment, design image data is generated by using the developing circuit 140 and the reference circuit 142 shown in FIG. 1. As described above, with a miniaturization of a pattern in recent years, it becomes difficult to match the design image data with the measurement data such that a pseudo defect is not generated. This is mostly due to the difficulty of uniform drawing of a pattern on the entire surface of the target plate and local formation of complex patterns. Therefore, in the first embodiment, a comparing process system in which an inspection threshold value is variable by using region image data to suppress a pseudo defect is established.

Figure 6:
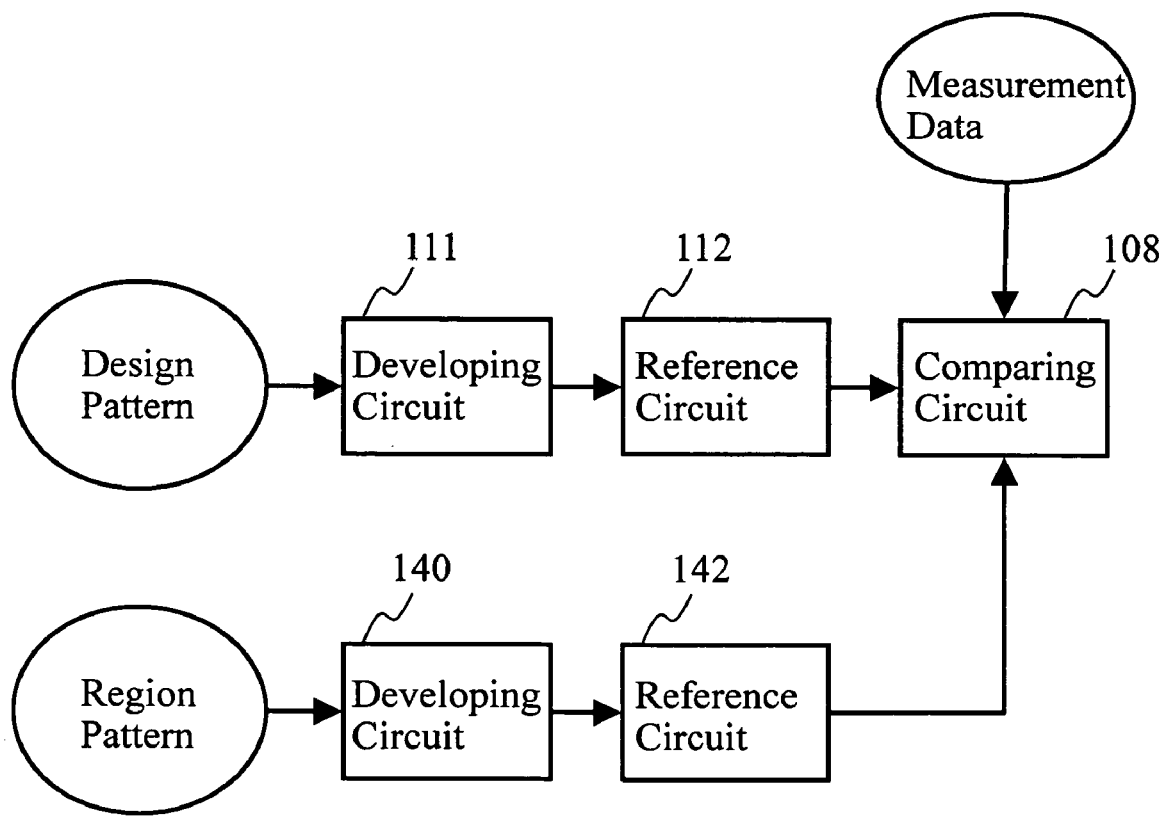
FIG. 6 is a block diagram of a circuit configuration in accordance with the flow chart of the main steps in the pattern inspection method.

FIG. 6 is a block diagram of a circuit configuration according to a flow chart of main steps in the pattern inspection method.

In FIG. 6, the measurement data is transmitted to the comparing circuit 108 as described above. The design pattern is converted into design image data by the developing circuit 111 and the reference circuit 112, and the design image data is transmitted to the comparing circuit 108. On the other hand, information of the region pattern generated in the same format as that of the design pattern is converted into region image data by the developing circuit 140 and the reference circuit 142 serving as a circuit system different from the design pattern converting unit, and the design image data is transmitted to the comparing circuit 108. The first design image data is converted into region image data by the developing circuit 140 and the reference circuit 142 serving as another circuit system to make it possible to parallelly perform the design pattern converting process and the design pattern converting process.

In step S222, as the storing step, the information of region pattern is stored in the magnetic disk device 109 serving as an example of a storing device (storing unit).

In step S224, as the developing step, the developing circuit 140 reads the information of the region pattern from the magnetic disk device 109 through the control computer 110, the read region pattern is converted into binary or multivalued image data (region image data), and the image data is transmitted to the reference circuit 142.

The developing circuit 140, as in the developing circuit 111 explained in FIG. 4, has the hierarchical structure developing circuit 202, the adjusting circuit 204, the pattern generating circuits 206, the pattern memories 208, and the pattern read circuit 210. The pattern generating circuits 206 and the pattern memories 208 are arranged in a plurality of stages such that each pattern generating circuit 206 and each pattern memory 208 constitute one pair.

A region included in the region pattern is expressed by a rectangle or a triangle like a graphic included in the design pattern. For example, graphic data which define the shapes, sizes, positions, and the like of pattern graphics by information such as coordinates (x, y) at reference positions of the graphics, lengths of sides, and graphic codes serving as identifiers which discriminate graphic types such as a rectangle and a triangle from each other are stored. More specifically, the information of the region pattern is formed in the same format as that of the information of the design pattern.

When the information of the region pattern serving as the graphic data is input to the developing circuit 140, the hierarchical structure developing circuit 202 develops the information into data, which indicates region, of each graphic and interprets the graphic code representing a graphic shape of the graphic data, a graphic size, and the like. In the pattern generating circuit 206, as a pattern arranged in a grid serving as a unit having a predetermined quantization size, binary or multivalued design image data is developed. The developed region image data is temporarily accumulated in the pattern memory 208. In other words, in the pattern generating circuit 206 serving as an example of an occupation rate calculating unit, the information of the region pattern is loaded, an occupation rate of a graphic that indicates the region in a region data is calculated in each grid obtained by virtually dividing the inspection region in units of predetermined sizes, and n-bit occupation-rate data is output to the pattern memory 208. For example, 8-bit occupation-rate data in which "1" is set at the first-bit digit indicates that the pixel is a pixel in a region represented by the region data.

In order to cause the plurality of pattern generating circuits 206 to efficiently perform a parallel processing operation, the adjusting circuit 204 distributes input data to the respective pattern generating circuits 206. The pattern read circuit 210 reads the occupation rate data stored in the pattern memories 208. In the pattern read circuit 210, when occupation-rate data is present in the same pixel, the occupation data is added to the read data and read. In this manner, a graphic occupation rate (grayscale value) in each pixel is known.

In step S226, as the filter processing step, the reference circuit 142 performs a filter processing appropriate to region image data serving as image data of a transmitted graphic. When the same filter processing is also performed to region image data like the design image data as described in FIG. 5, the same circuit configuration as that for the design image data can be used. In this case, although the filter processing step is performed, the step may not be performed.

In step S228, as the comparing step (2), when a difference exceeds a predetermined threshold value and it is determined that there is a defect (NG), the comparing circuit 108 loads region image data generated by the developing circuit 140 and the reference circuit 142, compares an optical image serving as measurement data of a pattern to be inspected with design image data according to a predetermined algorithm while an inspection threshold value (inspection sensitivity) is changed based on the region image data, and determines the presence/absence of a defect.

The measurement data may be compared with the design image data while steadily changing an inspection threshold value (inspection sensitivity) based on the region image data. As shown in FIG. 2, the following method is also more preferable in consideration of time required for a comparing process. That is, when a defective portion detected in comparison with the design image data is generated (NG), the measurement data is compared with the design image data while changing an inspection threshold value (inspection sensitivity) serving as a determination condition based on the region image data. In other words, in the comparing circuit 108, when a difference resulting from a comparison between the measurement data serving as optical image data and the design image data exceeds a predetermined threshold value, the inspection threshold value (inspection sensitivity) is more preferably changed based on the region image data to compare the measurement data with the design image data again.

With the above configuration, the comparing circuit 108 detects a defect while changing a comparative determination threshold value of a region to be compared by region image data. Therefore, a region in which a defect must be strictly detected is inspected by a stringent determination threshold value, and a region which is not considerably important can be prevented from being unnecessarily inspected by a stringent determination threshold value. As a result, a large number of pseudo defects can be prevented from being generated.

In this case, a pattern in which a pseudo defect is likely to be generated when the design image data and the measurement data are compared with each other and inspected will be described below.

Figure 7:
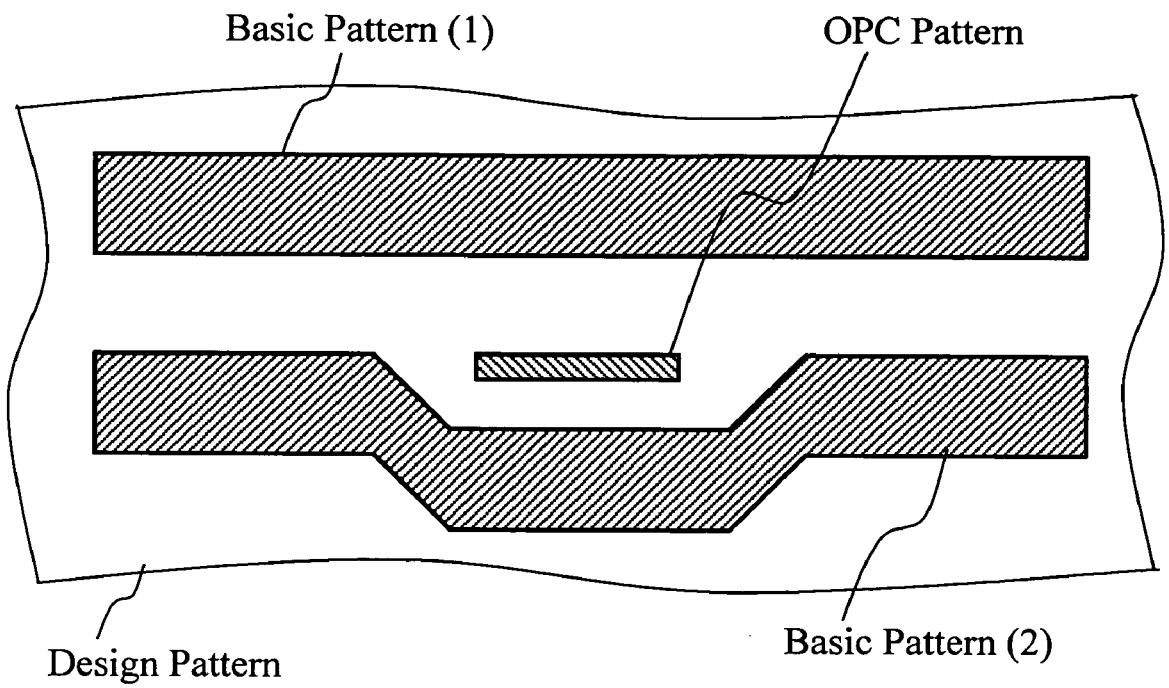
FIG. 7 is a diagram showing an example of design pattern data on which an OPC pattern is arranged.

FIG. 7 is a diagram showing an example of the design pattern on which the OPC pattern is arranged.

In FIG. 7, as the design pattern, two adjacent line patterns are formed. As one basic pattern (1), a straight line pattern is formed. As the other basic pattern (2), a pattern is formed such that a trace is externally bent once without change in line width and returns to the original position. The trace is externally bent to make a space inside. An OPC pattern serving as an assist pattern having a line width smaller than that of the basic pattern such that a space (distance) between the pattern and the straight line pattern is equal to a space of another portion is arranged in a space portion where the space (distance) between the pattern and the straight line pattern increases.

Figure 8:
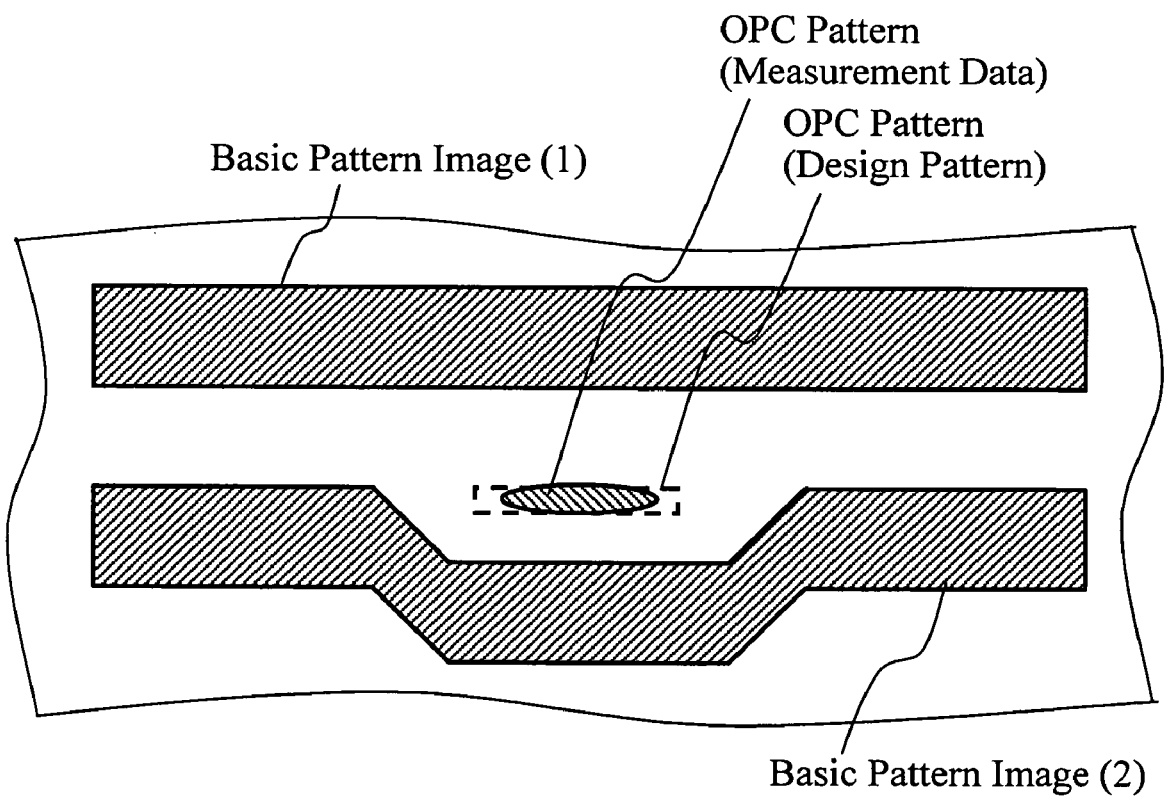
FIG. 8 is a diagram showing a shape of measurement data based on the design pattern on which the OPC pattern is arranged.

FIG. 8 is a diagram showing the shape of measurement data based on the design pattern data on which the OPC pattern shown in FIG. 7 is arranged.

As shown in FIG. 8, when a graphic pattern in the design pattern on which the OPC pattern shown in FIG. 7 is arranged is drawn on a mask serving as a target plate by a drawing device, the OPC pattern decreases in size like an OPC pattern image shown in FIG. 8. On the other hand, in the design image data converted from the design pattern (reference image data), the OPC pattern slightly decreases in size although the four corners of the OPC pattern round. Therefore, in this state, when the design image data converted from the design pattern is compared with the measurement data shown in FIG. 8, it may be determined that the mask is defective (NG).

As described above, the OPC pattern has pattern lines which are considerably narrower or shorter than those of a pattern mainly used as the target plate as shown in FIG. 7. In addition, the pattern actually drawn on the target plate based on the design pattern, as shown in FIG. 8, is not accurately formed in many cases. When this pattern is inspected by the same comparison threshold value as that of another pattern, an inspection apparatus may recognize the target plate as a defect.

However, in many cases, it is not very important whether or not the size of the pattern is correct. When the pattern is detected as a defect, a large number of pseudo defects are generated on the entire surface of the target plate, and it becomes difficult to effectively use the apparatus. Therefore, a region as explained below is set.

Figure 9:
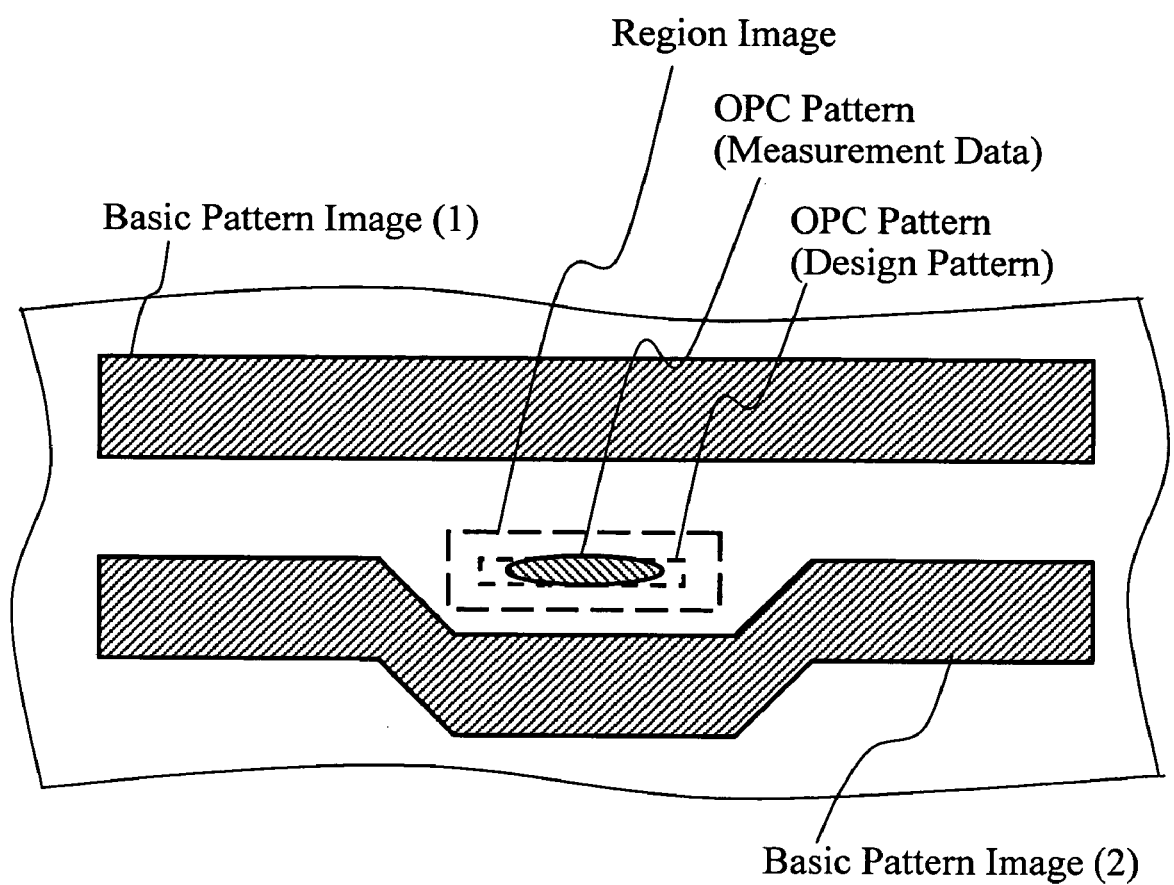
FIG. 9 is a diagram for explaining a region indicated by region image data.

FIG. 9 is a diagram for explaining a region expressed by region image data.

A region pattern serving as a base of region image data representing a region the inspection sensitivity of which need not be high near an OPC pattern as shown in FIG. 9 is prepared, the region pattern is converted into region image data, and the region image data is input to the comparing circuit 108. As a result, the comparing circuit 108 can automatically moderate a comparative threshold value near the region. Therefore, a pattern which is conventionally detected as a pseudo defect can be detected as a nondefective pattern. The region pattern preferably has a size which is slightly larger than that of a portion (in this case, an OPC pattern portion) which is desired to be designated in consideration of the error resulting from a displacement. For example, a region which is entirely enlarged by one pixel is preferably used.

As described above, the region pattern is prepared, and, by using region image data formed from the region pattern, design image data formed from the design pattern is compared with the measurement data to reduce the number of pseudo defects.

SECOND EMBODIMENT

In the first embodiment, the case of an OPC pattern has been described above. However, patterns in which pseudo defects can be generated are not limited to the OPC pattern. As another example, as in a second embodiment, a case in which a resized pattern is to be inspected will be described below. Since an apparatus configuration and the steps of a pattern inspection method are the same as those in the first embodiment, the description will not be repeated.

Figure 10:
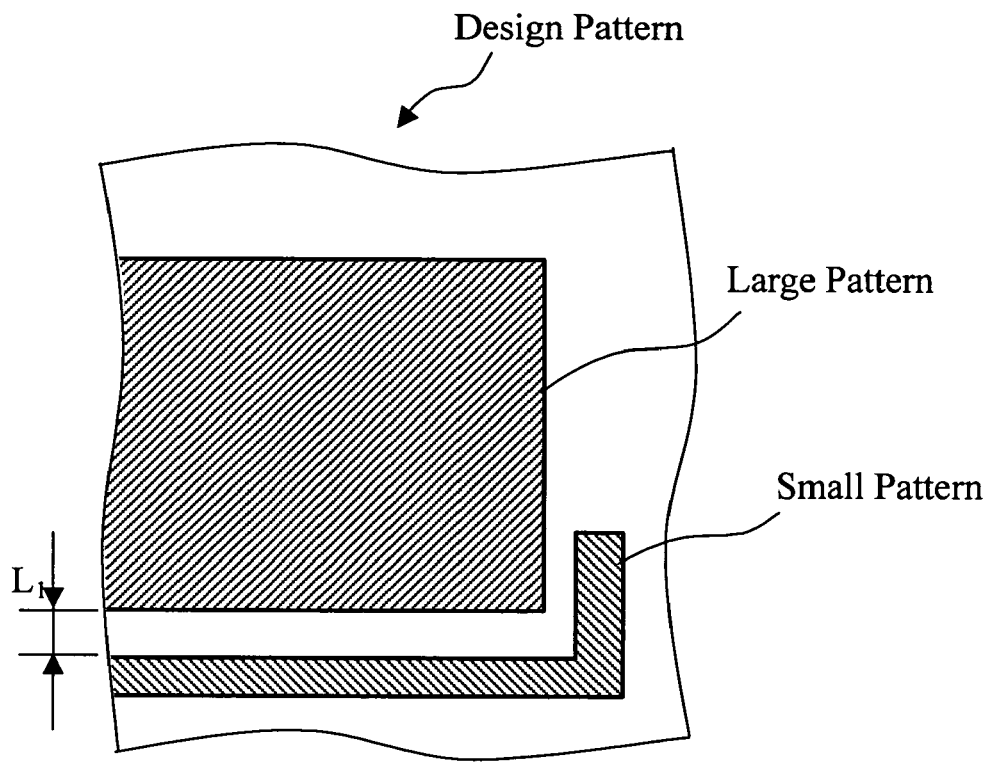
FIG. 10 is a diagram showing an example of a design pattern.

FIG. 10 is a diagram showing an example of a design pattern.

In FIG. 10, as design patterns, large and small patterns serving as basic patterns are formed. The small pattern is arranged adjacent to one side of the large pattern with a distance L1. Not only on an OPC pattern, but on a target plate, a large number of patterns having different sizes as shown in FIG. 10 are present. Depending on processes for manufacturing target plates, a relatively small pattern may often further decrease in size by drawing the pattern on a target plate. Therefore, when the small pattern is formed in consideration of a resize amount, an error in the large pattern may not be neglected.

Figure 11:
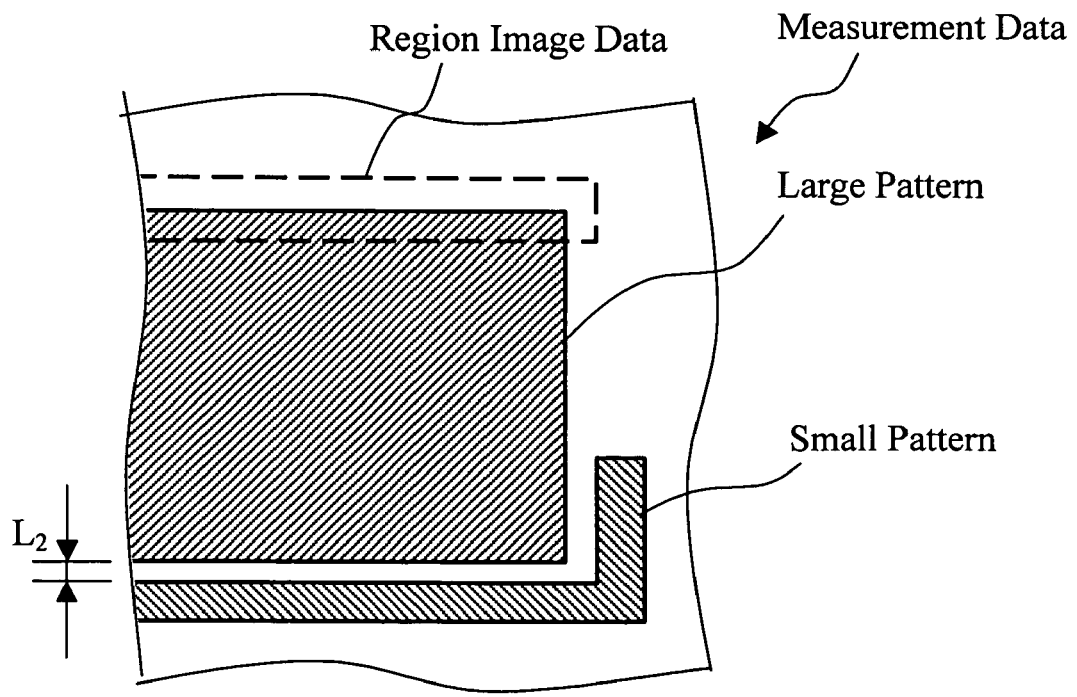
FIG. 11 is a diagram showing an example of measurement data obtained when a small pattern shown in FIG. 10 is formed in consideration of a resize amount.

FIG. 11 is a diagram showing an example of measurement data obtained when a small pattern shown in FIG. 10 is formed in consideration of a resize amount.

As shown in FIG. 11, when the small pattern is formed in consideration of a resize amount, a large pattern size may increase, and a distance to the small pattern adjacent to one side of the large pattern may be a distance L2 which is smaller than the distance L1. Therefore, depending on a manner of displacement of the large pattern, the large pattern may be brought into contact with the small pattern to be short-circuited. The displacement of the large pattern cannot be neglected. For this reason, an inspection threshold value in a region where the large pattern is adjacent to the large pattern is required to be stringent.

However, in a region of the fringe of the large pattern, which is not adjacent to the small pattern, an inspection threshold value is not required to be stringent. In many cases, the large pattern itself does not require such high precision. It is not considerably important whether the size of the large pattern be correct. When the pattern is detected as a defect, a large number of pseudo defects are generated on the entire surface of the target plate, and it becomes difficult to effectively use the apparatus.

As shown in FIG. 11, in a region of the vicinity of the large pattern, which is not adjacent to the small pattern, a region pattern is formed and prepared in advance such that region image data representing the region is generated to moderate an inspection threshold value of the portion in the comparing circuit 108. As a result, the number of pseudo defects can be reduced.

Alternatively, on the contrary, a region pattern is formed and prepared in advance such that region image data representing the region is the region of the vicinity of the large pattern where the large pattern and the small pattern are adjacent to each other is formed in the region where the large pattern and the small pattern are adjacent to each other, so that an inspection threshold value of the portion is preferably changed to a stringent inspection threshold value in the comparing circuit 108.

THIRD EMBODIMENT

In a third embodiment, since an apparatus configuration and steps of a pattern inspection method are the same as those in the first embodiment, a description thereof will not be repeated.

Figure 12:
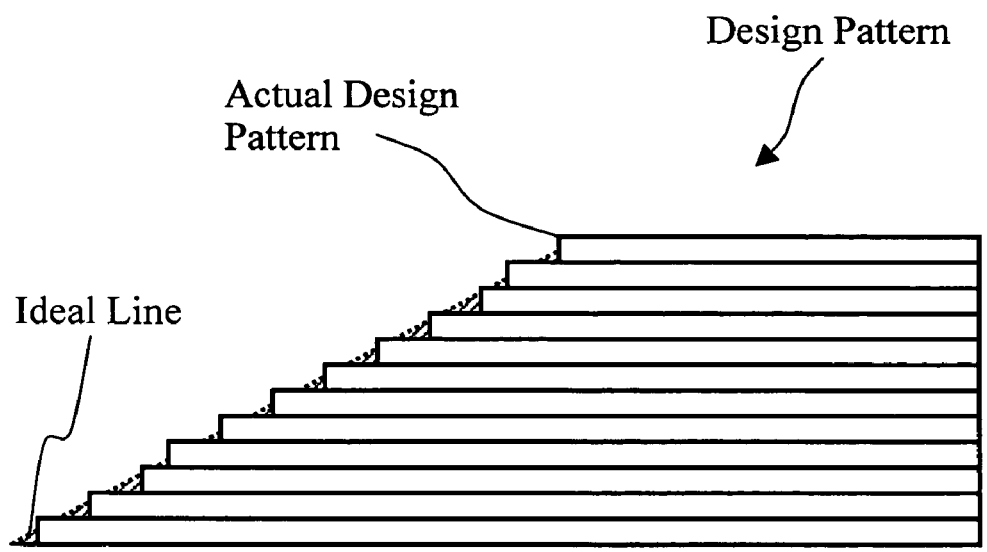
FIG. 12 is a diagram showing an example obtained when a format of a graphic pattern is converted into an apparatus input format.

FIG. 12 is a diagram showing an example obtained when a format of a graphic pattern is converted into an apparatus input format.

Figure 13:
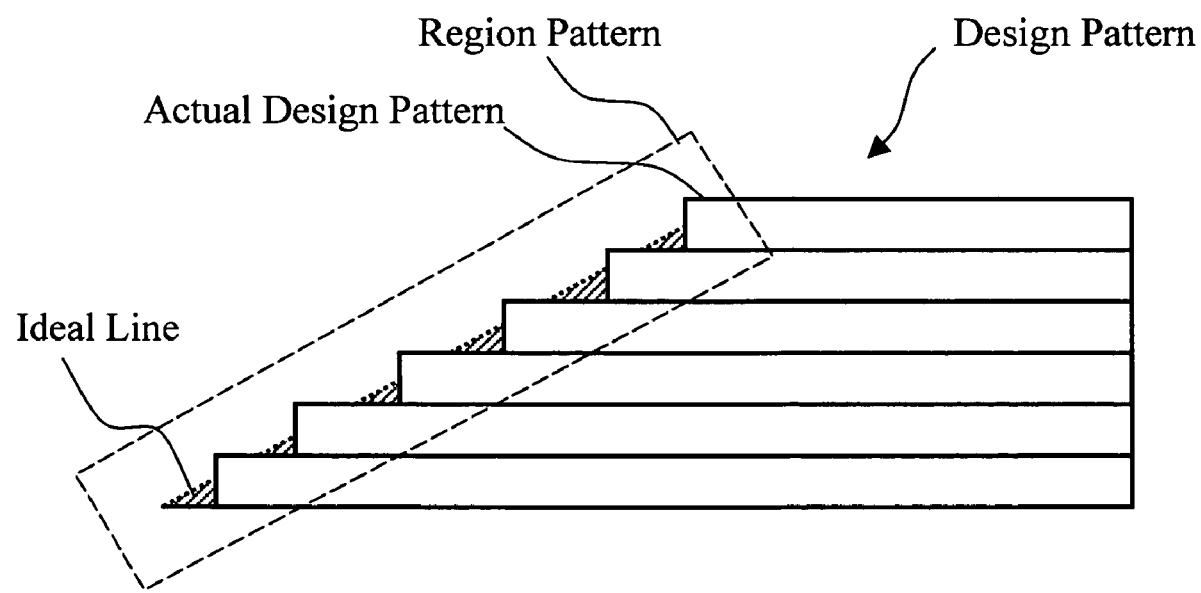
FIG. 13 is a diagram showing another example obtained when a format of a graphic pattern is converted into an apparatus input format.

FIG. 13 is a diagram showing another example obtained when a format of a graphic pattern is converted into an apparatus input format.

As a design pattern input to a pattern inspection apparatus 100, a design pattern the format of which is converted from the format of a graphic pattern originally formed in design of a target plate into an apparatus input format by some data conversion is generally used. As shown in FIG. 12, when the number of graphics to be divided to improve precision in the conversion is increased, a data amount disadvantageously increases, and converting time becomes excessively long. As shown in FIG. 13, when the number of graphics to be divided is decreased at the cost of the precision in the conversion, a pseudo defect may be generated by deterioration of precision of reference image data in comparative inspection with measurement data.

Therefore, the apparatus is operated at precision approximate to the precision required by a target plate to be inspected. However, the precision may be locally insufficient, and a pseudo defect may be generated. For example, as a conventional oblique pattern, a 45° oblique pattern is mainly used. However, in recent years, some target plate uses an angle other than the angle of 45°. This pattern tends to causes an error in the design patterns.

In the third embodiment, in a region where precision is locally insufficient and accordingly becomes a pseudo defect, for example, as shown in FIG. 13, in a region wherein an oblique pattern is generated, region data is formed and prepared in advance near an ideal line of the oblique pattern such that region image data representing the region is generated, so that an inspection threshold value of the portion is preferably moderated in the comparing circuit 108. As a result, in the portion where an error is likely to be generated, sensitivity information can be controlled by using the region data. Accordingly, the number of pseudo defects can be reduced, and the apparatus can be advantageously used.

FOURTH EMBODIMENT

In a fourth embodiment, since an apparatus configuration and the steps of a pattern inspection method are the same as those in the first embodiment, a description thereof will not be repeated.

A region pattern is preferably present to an entire region to be inspected. However, the apparatus is not efficiently used when a developing process of a region pattern is needlessly performed to a region where the inspection sensitivity is desired to be constant to convert the region pattern into region image data. Therefore, it is also practical that the developing process of the region pattern is performed to a region where a large number of OPC patterns of the first embodiment are present to convert the region pattern into region image data.

In the embodiments described above, the region pattern may be either pattern data to a region which must be inspected by an inspection threshold value which is more stringent than the inspection threshold value to a normal pattern region or pattern data to a region which must be inspected by a more moderate inspection threshold value.

FIFTH EMBODIMENT

In the fifth embodiment, since an apparatus configuration and the steps of a pattern inspection method are the same as those in the first embodiment, a description thereof will not be repeated.

In the embodiments described above, two types of design data, i.e., design image data converted from an original design pattern and region image data converted from a region pattern are handled. However, when inspection sensitivities are desired to be switched depending on the plurality of types, it is sufficiently conceivable and also preferable that inspection is performed by using a second region pattern serving as third design data and second and subsequent region image data converted from region patterns of three or more types. In this case, the comparing circuit 108 retrieves a plurality of region image data to make it possible to determine whether region image data serving as an information source for checking whether an inspection threshold value for a pixel to be compared and inspected is present or not. Furthermore, as an apparatus configuration, in FIG. 1, developing circuit 140 and reference circuits 142, the numbers of which are the same as that of second and subsequent region image data to be generated, are preferably further arranged.

When the inspection sensitivities are desired to be switched depending on the plurality of types, it is more preferable that the inspection sensitivities are gradually switched because processing time for changing set values can be shortened.

With respect to pixels to be compared and inspected, a method which can make processing time shorter than the processing time required when the comparing circuit 108 retrieves the plurality of region image data will be described below.

Figure 14:
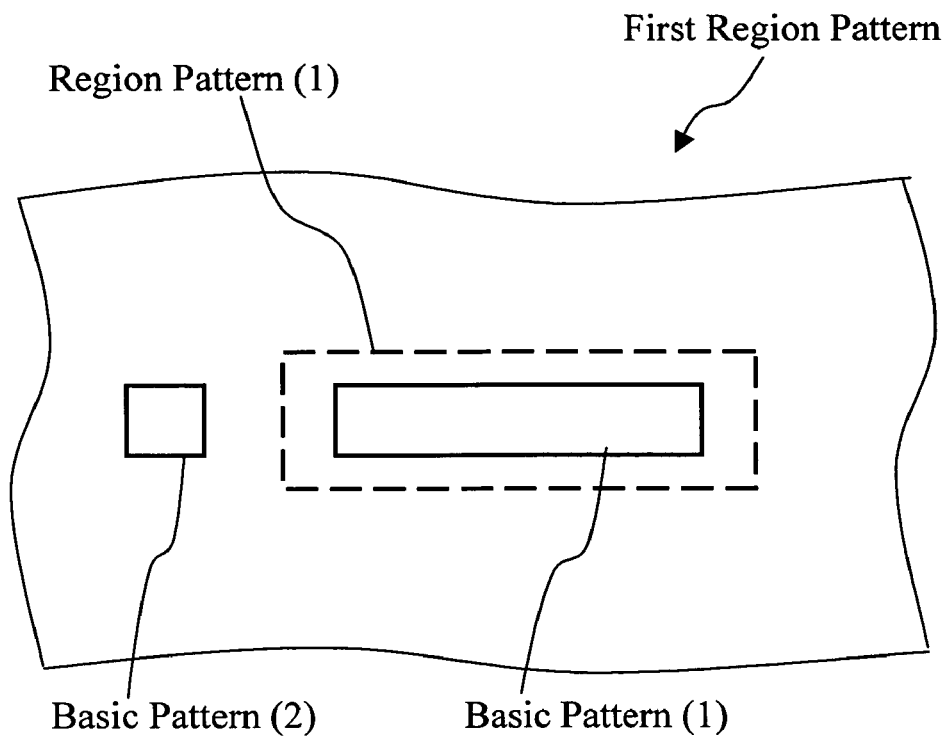
FIG. 14 is a diagram showing an example of a first region pattern.

FIG. 14 is a diagram showing an example of a first region pattern.

Figure 15:
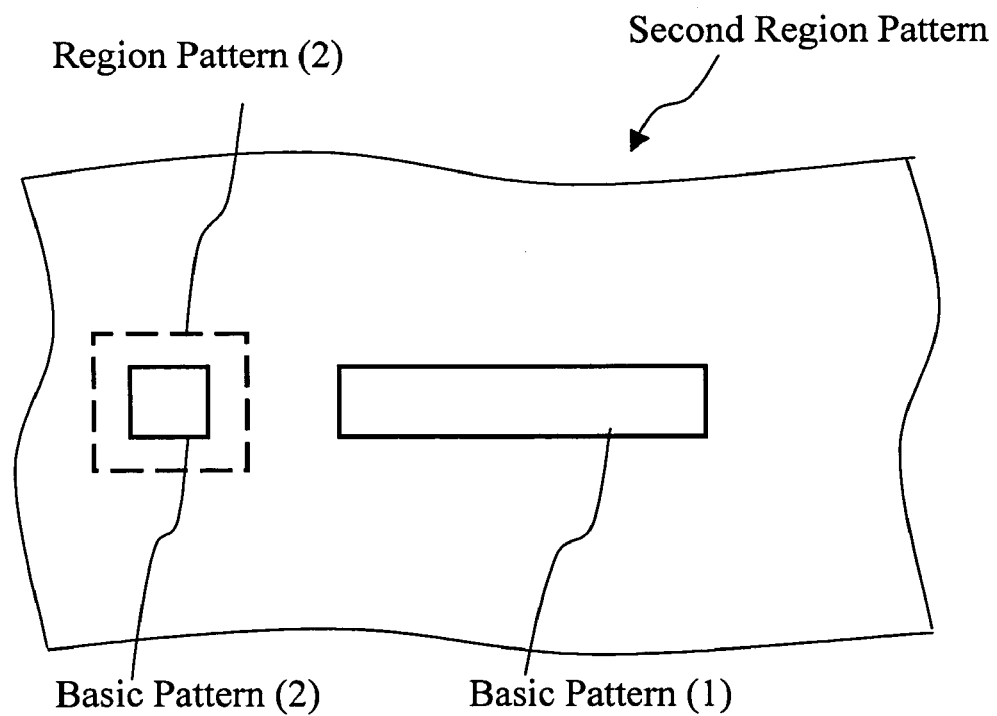
FIG. 15 is a diagram showing an example of a second region pattern.

FIG. 15 is a diagram showing an example of a second region pattern.

Figure 16:
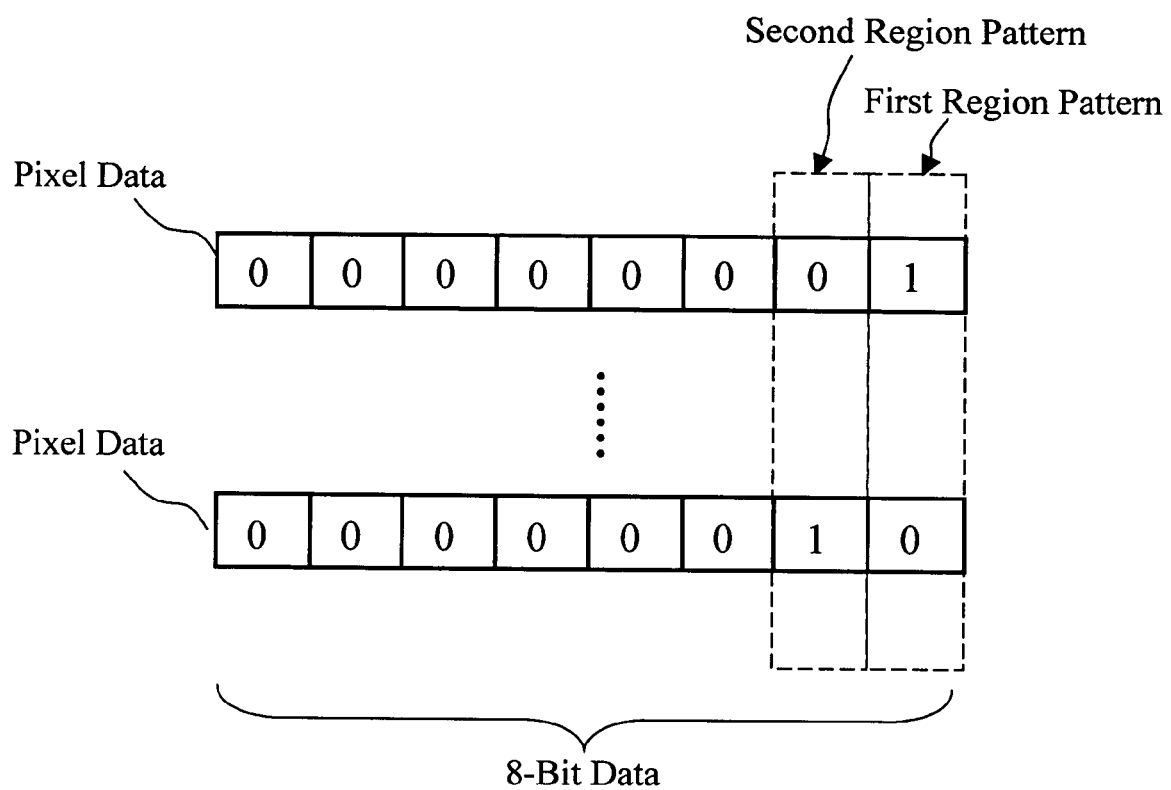
FIG. 16 is a diagram showing an example of region image data.

FIG. 16 is a diagram showing an example of region image data.

When a basic pattern (1) and a basic pattern (2) are arranged as design pattern data, the first region pattern is set in FIG. 14 such that a region near the basic pattern (1) is inspected by an inspection threshold value, and the second region pattern is set in FIG. 15 such that a region near the basic pattern (2) is inspected by another inspection threshold value. In such a case, when bit development is performed for every pixel by the developing circuit 140, as shown in FIG. 16, the region image data is expressed as n-bit pixel data (in this case, as an example, 8-bit data) for every pixel. The first region pattern is converted such that "1" is set at the first bit in a pixel in a region shown in the first region pattern, and the second region pattern is converted such that "1" is set at the second bit in a pixel in a region shown in the second region pattern. In this configuration, even though a plurality of region patterns are used, a plurality of region image data can be brought into one region image data. As a result, the comparing circuit 108 retrieves one region image data to determine a threshold value of the plurality of inspection threshold values with respect to a pixel to be compared and inspected.

It is more preferably considered that the apparatus excessively increases in size or inspection time is limited when the inspection threshold values are handled.

SIXTH EMBODIMENT

In a sixth embodiment, since an apparatus configuration is the same as that in the first embodiment, a description thereof will not be repeated. Since steps of a pattern inspection method are the same as those in the first embodiment except for parts described below, a description of the same parts will not be repeated.

In a process of generating region image data, when the region image data is generated and always input to the comparing circuit 108, inspection time can be stabilized. However, the region image data is rarely necessary throughout the entire surface of a target plate. Therefore, in order to prevent the apparatus from being excessively increased in size, in the flow chart in FIG. 2, it is practical that the region image data is generated to a part where a defective candidate appears in comparison with the design pattern. In other words, the region image data is preferably generated when a difference resulting from a comparison between the measurement data and the design image data in the comparing circuit 108 in the comparing step (1) in S218 exceeds a predetermined threshold value. The measurement data may be compared with the design image data in the comparing circuit 108 while the threshold value is changed into a threshold value indicated by the region image data in the comparing step (2) in S228.

As described above, the region image data is generated to a portion where a defective candidate appears to reduce the number of target plates which are conventionally determined as pseudo defects while shortening processing time. The apparatus can be effectively used, as repetition of the inspection can be avoided, for instance.

SEVENTH EMBODIMENT

In a seventh embodiment, since an apparatus configuration and steps of a pattern inspection method are the same as those in the first embodiment, a description thereof will not be repeated.

In general, the size of one pixel in design image data is frequently adjusted to the size of one pixel of measurement data. However, the size of one pixel in region image data is also fundamentally adjusted to the size of one pixel in the design image data. However, when it is known that the size of a region in which an inspection threshold value is changed is a certain size or more, the size of one pixel in the region image data is preferably made larger than the size of one pixel in the design image data instead of making the size of one pixel in the design image data equal to the size of one pixel in the region image data.

Figure 17:
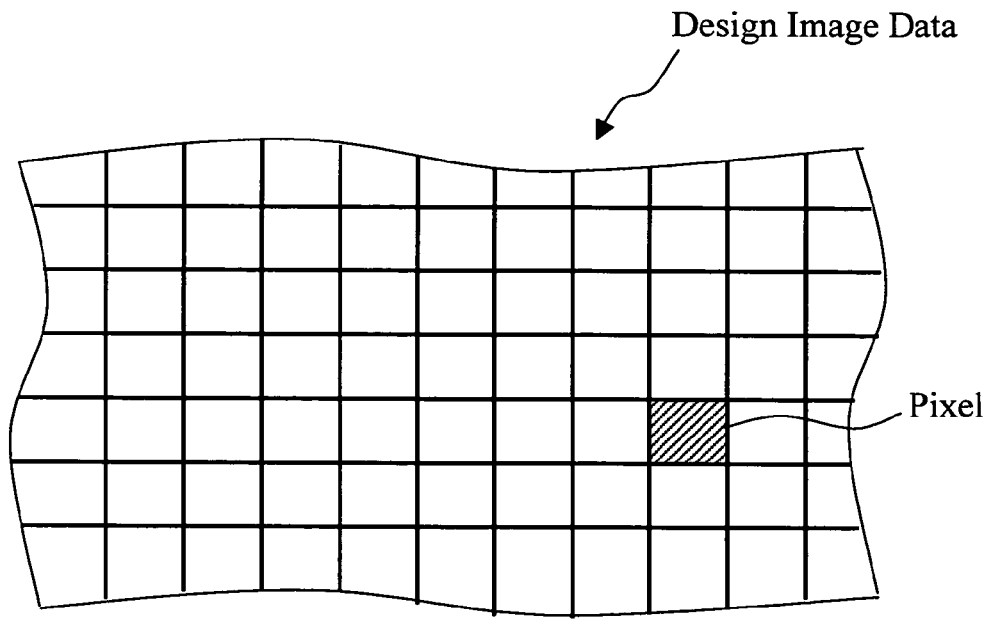
FIG. 17 is a diagram showing an example of a pixel region in design image data.

FIG. 17 is a diagram showing an example of a pixel region in design image data.

Figure 18:
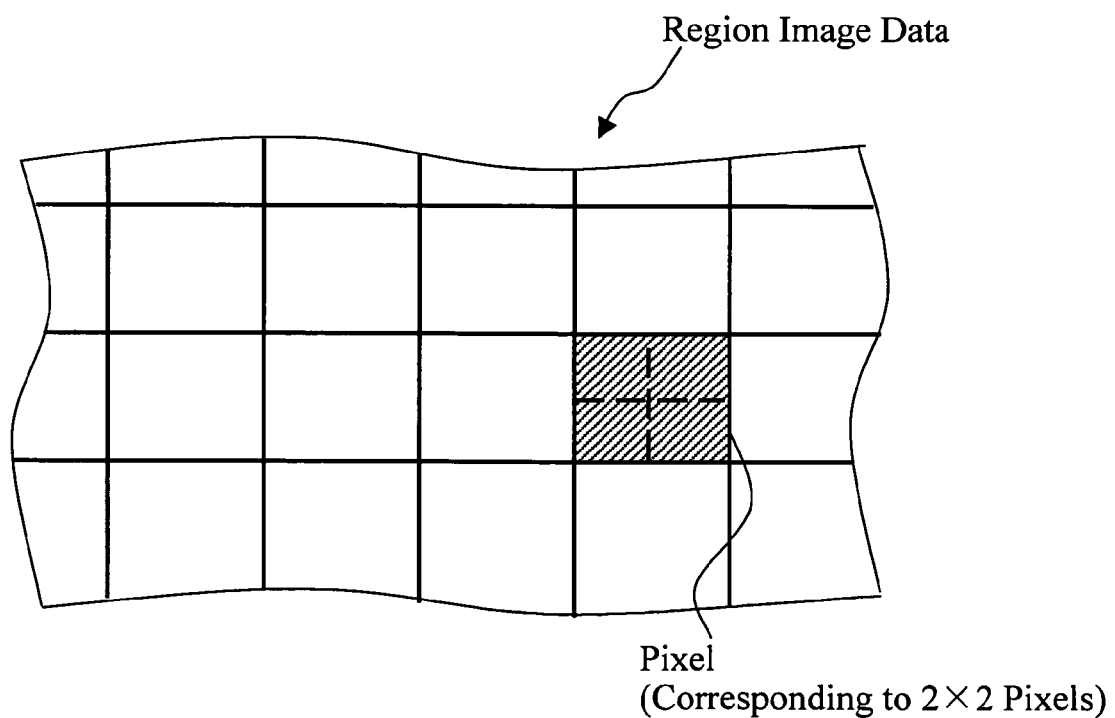
FIG. 18 is a diagram showing an example of the pixel region in design image data.

FIG. 18 is a diagram showing an example of the pixel region in design image data.

When a pixel region in the design image data is virtually divided into grids each having a predetermined quantization size as a unit as shown in FIG. 17 like the measurement data, the pixel region in the region image data is virtually divided into grids each having a size larger than the quantization size in the design image data as a unit as shown in FIG. 18. The design image data is generated as occupation-rate data of a grid having the size as a unit. For example, in FIG. 18, a process of making the size of 2×2 pixels of the design image data (measurement data) equal to the size of one pixel of the region image data is performed to reduce the number of pixels of the region image data in a region to be inspected. Therefore, a data amount of the region pattern can also be reduced, and processing time required when the region pattern is converted into region image data can be practically shortened.

As described above, region image data converted from information of the region pattern formed in the same format as that of the information of the design pattern and representing a predetermined region of a target plate to be inspected is used to reduce the number of patterns which are conventionally determined as pseudo defects, and the apparatus can be effectively used, as repetition of the inspection can be avoided, for instance.

Figure 19:
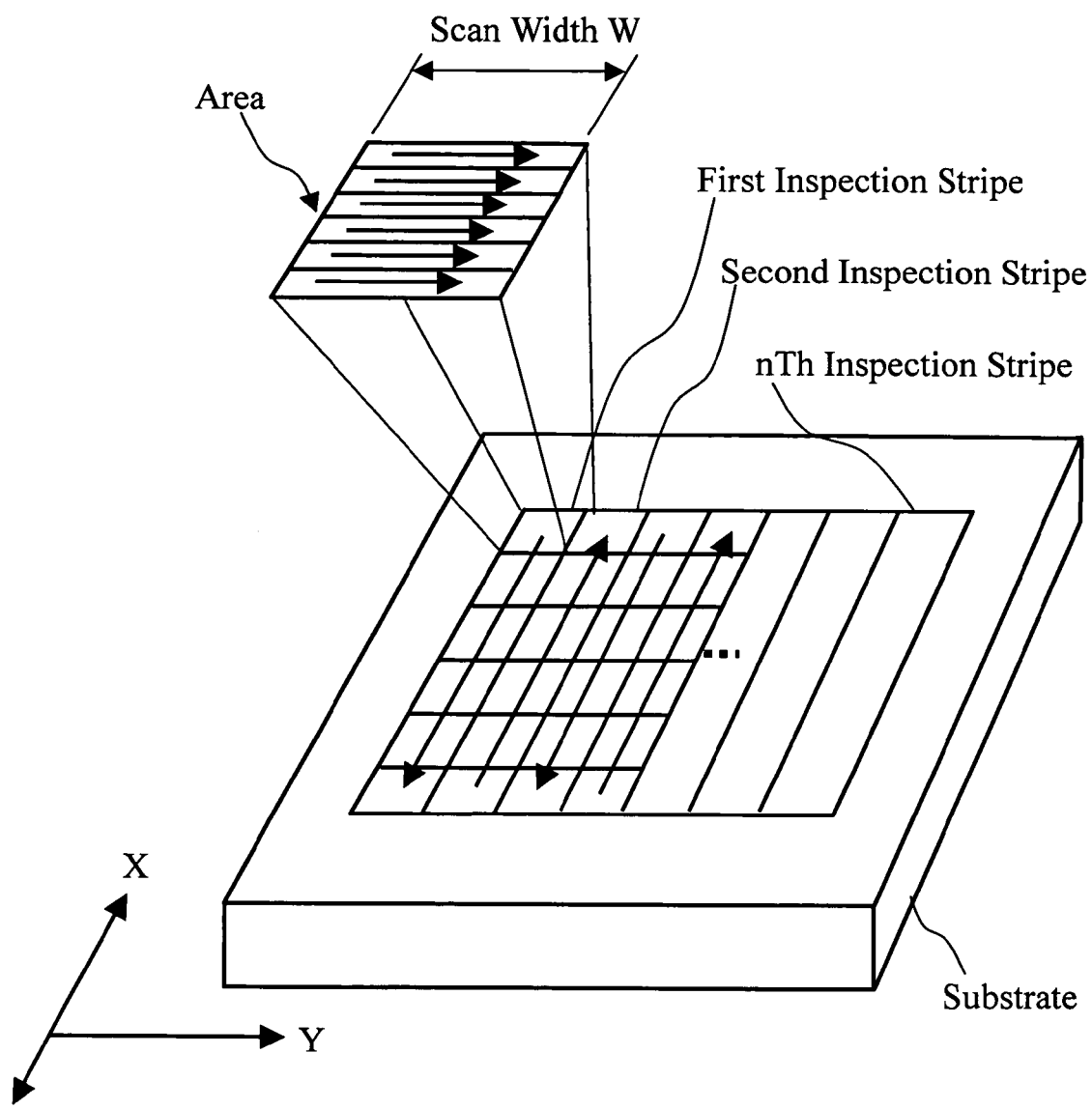
FIG. 19 is a diagram for explaining another optical image acquisition method.

FIG. 19 is a diagram for explaining another optical image acquisition method.

In the configuration in FIG. 1, the photodiode array 105 which simultaneously enters beams, the numbers of which are the number of pixels (for example, 2048 pixels) of a scan width, is used. However, the optical image acquisition method is not limited to using the photodiode array 105. As shown in FIG. 24, the following method may be used. That is, while the XYθ table 102 is slid at a constant rate in an X direction, a laser beam scans with a laser scanning optical device (not shown) in a Y direction each time movement of a predetermined pitch is detected by a laser interferometer, transmitted light is detected, and a two-dimensional image of each area having a predetermined size is acquired.

According to at least one of the embodiments described above, the number of target plates which are conventionally determined as pseudo defects can be reduced, and the apparatus can be effectively used, as repetition of the inspection can be avoided, for instance. In addition, defect detection precision in a pattern which requires a high precision can be improved.

In the above explanation, the various circuits and the various steps described above can be constituted by programs which can be operated by a computer. Alternatively, the circuits and the steps may be realized not only by programs serving as software but also by a combination of hardware and software. Alternatively, a combination of software and firmware may be used. When the circuits and the steps are constituted by programs, the programs are recorded on a recording medium such as a magnetic disk device, a magnetic tape device, an FD, or a ROM (Read Only Memory). For example, the table control circuit 114, the developing circuit 111, the developing circuit 140, the reference circuit 112, the reference circuit 142, the comparing circuit 108, and the like may be constituted by electric circuits or the like or may also be realized as software processed by the control computer 110. These circuit may also be realized by combinations of electric circuits and software.

The embodiments have been described with reference to the concrete examples. However, the present invention is not limited to these concrete examples. For example, in the embodiments, although transmitted light is used, reflected light may be used, or transmitted light and reflected light may be simultaneously used. In the embodiments, in order to develop the region pattern, the developing circuit 140 and the reference circuit 142, serving as an example of region image data generating unit, are arranged independently of the developing circuit 111 and the reference circuit 112 for developing the design pattern. The present invention is not limited to this configuration, and the developing circuit 111 and the reference circuit 112 for developing the design pattern data may be diverted to the development of the second design pattern data. More specifically, the region image data may be generated by diverting the developing circuit 111 and the reference circuit 112 serving as an example of a design image data generating unit for generating the design image data.

In the apparatus configurations, the control methods, and the like, parts or the like which are not directly required to explain the present invention are not described. However, a necessary apparatus configuration and a necessary control method can be appropriately selected and used.

In the apparatus configurations, the control methods, and the like, parts or the like which are not directly required to explain the present invention are not described. However, a necessary apparatus configuration and a necessary control method can be appropriately selected and used.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus, comprising:
   an optical image acquiring unit configured to acquire optical image data of a target plate to be inspected, the target plate being formed as a pattern;
   a design image data generating unit configured to generate design image data based on a design pattern serving as a base of pattern formation of the target plate; and
   a comparing unit configured to input region image data generated based on information of a region pattern which is input to the pattern inspection apparatus, wherein the information of the region pattern represents a predetermined region and is formed in the same format as that of information of the design pattern, and to compare the optical image data with the design image data based on the region image data,
   wherein both of the information of the region pattern and the information of the design pattern include, as the format, a coordinate (x, y), a length of side, and a graphic code serving as identifier which discriminates graphic type, and the region image data is generated using the coordinate (x, y), the length of side, and the graphic code included in the information of the region pattern.

2. The pattern inspection apparatus according to claim 1, wherein in the comparing unit, when a difference resulting from a comparison between the optical image data and the design image data without using the region image data exceeds a predetermined threshold value, the design image data is compared with the optical image data again based on the region image data.

3. The pattern inspection apparatus according to claim 1, wherein in the comparing unit, a determination condition is changed based on the region image data.

4. The pattern inspection apparatus according to claim 1 further comprising a region image data generating unit configured to generate the region image data.

5. The pattern inspection apparatus according to claim 1, wherein the region image data is generated by diverting the design image data generating unit.

6. The pattern inspection apparatus according to claim 1, wherein the region image data is generated when a difference resulting from a comparison between the optical image data with the design image data by the comparing unit exceeds a predetermined threshold value.

7. The pattern inspection apparatus according to claim 1, wherein the design image data is generated as occupation-rate data of a grid having a predetermined size as a unit, and the region image data is generated as occupation-rate data of a grid having a size larger than the predetermined size as a unit.

8. A pattern inspection method for a pattern inspection apparatus, the pattern inspection method comprising:
   acquiring, at the pattern inspection apparatus, optical image data of a target plate to be inspected, the target plate being formed as a pattern;
   generating, with the pattern inspection apparatus, design image data based on a design pattern serving as a base of pattern formation of the target plate;
   generating region image data based on information of a region pattern formed in the same format as that of information of the design pattern and representing a predetermined region of the target plate; and
   comparing, with the pattern inspection apparatus, the design image data with the optical image data by using the region image data,
   wherein both of the information of the region pattern and the information of the design pattern include, as the format, a coordinate (x, y), a length of side, and a graphic code serving as identifier which discriminates graphic type, and the region image data is generated using the coordinate (x, y), the length of side, and the graphic code included in the information of the region pattern.

9. A computer-readable storage medium on which a program is recorded, the program, when executed by a computer, causes the computer to execute a method comprising:
   storing information of a design pattern serving as a base of pattern formation on a target plate to be inspected, the target plate being formed as a pattern, and information of a region pattern which is input to a pattern inspection apparatus, wherein the information of the region pattern is formed in the same format as that of the information of the design pattern and represents a predetermined region on the target plate, in a storing device;

generating design image data based on the information of the design pattern stored in the storing device;

generating region image data based on the region pattern stored in the storing device;

receiving optical image data of the target plate; and comparing the design image data with the optical image data by using the region image data, wherein both of the information of the region pattern and the information of the design pattern include, as the format, a coordinate (x, y), a length of side, and a graphic code serving as identifier which discriminates graphic type, and the region image data is generated using the coordinate (x, y), the length of side, and the graphic code included in the information of the region pattern.

10. The pattern inspection apparatus according to claim 1, wherein the comparing unit inputs plural region image data generated based on information of plural region pattern, and compares the optical image data with the design image data based on the plural region image data.

* * * * *